United States Patent
Jing et al.

(10) Patent No.: US 10,684,512 B2
(45) Date of Patent: Jun. 16, 2020

(54) CELL FORMING DEVICE AND ALIGNMENT METHOD

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Yangkun Jing, Beijing (CN); Jian Sun, Beijing (CN); Junwei Xia, Beijing (CN); Xuling Xue, Beijing (CN); Dongdong Zhai, Beijing (CN); Zhongqing Li, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 72 days.

(21) Appl. No.: 15/511,102

(22) PCT Filed: May 17, 2016

(86) PCT No.: PCT/CN2016/082378
§ 371 (c)(1),
(2) Date: Mar. 14, 2017

(87) PCT Pub. No.: WO2016/188348
PCT Pub. Date: Dec. 1, 2016

(65) Prior Publication Data
US 2018/0224681 A1 Aug. 9, 2018

(30) Foreign Application Priority Data
May 22, 2015 (CN) .......................... 2015 1 0268313

(51) Int. Cl.
*G06K 9/00* (2006.01)
*G02F 1/1337* (2006.01)
(Continued)

(52) U.S. Cl.
CPC .......... *G02F 1/1337* (2013.01); *G02F 1/1303* (2013.01); *G02F 1/1343* (2013.01);
(Continued)

(58) Field of Classification Search
CPC ..... G01L 9/0042; G01L 15/00; H01L 41/083; H01L 41/0471; H01L 29/66007; G06F 3/04144; G06F 3/045
See application file for complete search history.

(56) References Cited

U.S. PATENT DOCUMENTS 5,343,064 A * 8/1994 Spangler ............. B81C 1/00246
257/350
2004/0001177 A1 * 1/2004 Byun .................... G02F 1/1339
349/187

(Continued)

FOREIGN PATENT DOCUMENTS

CN 1568493 A 1/2005
CN 101144926 A 3/2008
(Continued)

OTHER PUBLICATIONS

First Office Action for Chinese Application No. 201510268313.X, dated Dec. 5, 2016, 7 Pages.
(Continued)

*Primary Examiner* — Guillermo M Rivera-Martinez
(74) *Attorney, Agent, or Firm* — Brooks Kushman P.C.

(57) ABSTRACT

A cell forming device, including a first platform configured to carry a first substrate, a second platform configured to carry a second substrate, and a pre-alignment mechanism. The first platform includes a first suction surface and a
(Continued)

second suction surface arranged opposite to each other and configured to attach the first substrate. The pre-alignment mechanism is configured to adjust a position of the first platform to pre-align the first substrate with the second substrate. The cell forming device further includes a turn-over mechanism configured to turn the first platform over to turn the first substrate over, an alignment mechanism configured to adjust a position of the second platform to align the turned first substrate with the second substrate, and a cell forming mechanism configured to move the first substrate to form a cell with the second substrate.

17 Claims, 4 Drawing Sheets

(51) Int. Cl.
G02F 1/13 (2006.01)
H01J 9/24 (2006.01)
G02F 1/133 (2006.01)
G02F 1/1343 (2006.01)
G02F 1/1333 (2006.01)

(52) U.S. Cl.
CPC ......... G02F 1/13306 (2013.01); H01J 9/241 (2013.01); G02F 2001/133394 (2013.01)

(56) References Cited

U.S. PATENT DOCUMENTS

| | | | | |
|---|---|---|---|---|
| 2004/0212774 | A1* | 10/2004 | Yamazaki | C03B 33/033 349/187 |
| 2005/0121739 | A1* | 6/2005 | Fukuhara | G02F 1/136227 257/443 |
| 2005/0177343 | A1* | 8/2005 | Nagae | B41J 29/393 702/183 |
| 2006/0113192 | A1* | 6/2006 | Kurashina | C25D 5/06 205/83 |
| 2008/0047651 | A1 | 2/2008 | Park | |
| 2008/0190981 | A1* | 8/2008 | Okajima | B65G 49/061 225/2 |
| 2008/0246109 | A1* | 10/2008 | Ohnuma | H01L 21/76254 257/507 |
| 2008/0261379 | A1* | 10/2008 | Jinbo | H01L 21/26506 438/458 |
| 2008/0268618 | A1* | 10/2008 | Yamazaki | H01L 21/2007 438/458 |
| 2010/0310993 | A1* | 12/2010 | Yamaguchi | B65H 20/00 430/325 |
| 2011/0001974 | A1* | 1/2011 | Harada | G03F 9/7011 356/401 |
| 2013/0201316 | A1* | 8/2013 | Binder | H04L 67/12 348/77 |
| 2016/0018744 | A1* | 1/2016 | Lafarre | G03F 7/70716 355/72 |
| 2016/0139438 | A1 | 5/2016 | Jing et al. | |
| 2016/0150689 | A1* | 5/2016 | Amano | H04N 5/2253 29/739 |
| 2016/0246081 | A1 | 8/2016 | Jing | |

FOREIGN PATENT DOCUMENTS

| | | |
|---|---|---|
| CN | 103454799 A | 12/2013 |
| CN | 103676284 A | 3/2014 |
| CN | 104360507 A | 2/2015 |
| CN | 104808370 A | 7/2015 |
| KR | 20080009543 A | 1/2008 |
| KR | 101371370 B1 | 3/2014 |

OTHER PUBLICATIONS

Second Office Action for Chinese Application No. 201510268313.X, dated Jun. 12, 2017 3 Pages.
International Search Report and Written Opinion for Application No. PCT/CN2016/082378, dated Jul. 28, 2016, 13 Pages.

* cited by examiner

CELL FORMING DEVICE AND ALIGNMENT METHOD

CROSS-REFERENCE TO RELATED APPLICATIONS

This application is the U.S. national phase of PCT Application No. PCT/CN2016/082378 filed on May 17, 2016, which claims priority to Chinese Patent Application No. 201510268313.X filed on May 22, 2015, the disclosures of which are incorporated in their entirety by reference herein.

TECHNICAL FIELD

The present disclosure relates to the field of liquid crystal manufacturing technology, in particular to a cell forming device and an alignment method.

BACKGROUND

Along with the development of liquid crystal display technology, liquid crystal display devices have been widely used in various electronic products due to such advantages as light-weight and small volume. The liquid crystal display device includes a liquid crystal display panel and a backlight module. The liquid crystal display panel consists of two substrates and a liquid crystal layer arranged between the substrates. During the manufacture of the liquid crystal display panel, the two substrates need to be aligned with each other, so as to form a liquid crystal cell for receiving liquid crystal molecules therein. During the cell alignment process, one of the substrates need to be turned over through a turn-over mechanism, and then this substrate is aligned with the other one of the substrates to form the cell.

A turn-over platform of the turn-over mechanism may turn the substrate over in a predetermined direction, and after the substrate is moved away through a mechanical arm, it is necessary to rotate the turn-over platform in a direction opposite to the predetermined direction by 180 degrees, so as to reset an attaching surface of the turn-over platform for subsequent attachment and turnover of other substrates. However, due to the operation of the turn-over mechanism, the time consumed for the cell alignment process may be extended, and thus the production efficiency may be adversely affected.

SUMMARY

To address the above-mentioned problem, the present disclosure provides a cell forming device and an alignment method, so as to improve the production efficiency and align a first substrate with a second substrate efficiently.

To this end, the present disclosure provides a cell forming device. The cell forming device includes a first platform configured to carry a first substrate, a second platform configured to carry a second substrate, and a pre-alignment mechanism configured to adjust a position of the first platform to pre-align the first substrate with the second substrate. The first platform includes a first suction surface and a second suction surface arranged opposite to each other and configured to attach the first substrate. The cell forming device further includes a turn-over mechanism configured to turn the first platform over to turn the first substrate over, an alignment mechanism configured to adjust a position of the second platform to align the overturned first substrate with the second substrate, and a cell forming mechanism configured to move the first substrate to form a cell with the second substrate.

In a possible embodiment of the present disclosure, the pre-alignment mechanism includes: a first driving mechanism connected to the first platform and configured to control the first platform to rotate; a second driving mechanism connected to the first platform and configured to control the first platform to move in a first direction in a horizontal plane; a third driving mechanism connected to the first platform and configured to control the first platform to move in a second direction which is in the horizontal plane and perpendicular to the first direction; and a fourth driving mechanism connected to the first platform and configured to control the first platform to move in a vertical direction.

In a possible embodiment of the present disclosure, the first driving mechanism includes: a first movable table connected to the first platform; a first rotatable central shaft connected to the first movable table via a bearing; a first driving motor; and a first transmission mechanism configured to be driven by the first driving motor to rotate the first rotatable central shaft.

In a possible embodiment of the present disclosure, the second driving mechanism includes: a second movable table connected to the first platform; a first guide rail arranged in the first direction, the second movable table being movably arranged on the first guide rail; a second driving motor; and a second transmission mechanism configured to be driven by the second driving motor to move the second movable table along the first guide rail.

In a possible embodiment of the present disclosure, the third driving mechanism includes: a third movable table connected to the first platform; a second guide rail arranged in the second direction, the third movable table being movably arranged on the second guide rail; a third driving motor; and a third transmission mechanism configured to be driven by the third driving motor to move the third movable table along the second guide rail. The third movable table and the second movable table are a same movable table, and the second guide rail intersects the first guide rail.

In a possible embodiment of the present disclosure, the fourth driving mechanism includes: a fourth movable table connected to the first platform; a third guide rail arranged in the vertical direction, the fourth movable table being movably arranged on the third guide rail; a fourth driving motor; and a fourth transmission mechanism configured to be driven by the fourth driving motor to move the fourth movable table along the third guide rail.

In a possible embodiment, the alignment mechanism has an identical structure to the pre-alignment mechanism.

In a possible embodiment of the present disclosure, the cell forming device further includes a buffering and stopping mechanism connected to the turn-over mechanism.

In a possible embodiment of the present disclosure, the cell forming device further includes a dynamic perception adjustment mechanism and a control circuit. The dynamic perception adjustment mechanism is secured onto the first platform and includes a plurality of sub-mechanisms each corresponding to a sub-region of the first substrate. Each sub-mechanism includes, from top to bottom, a flatness adjustment layer, a piezoelectric sensing layer and a surface suction layer. The piezoelectric sensing layer of each sub-mechanism is configured to: when the first substrate is aligned with the second substrate to form the cell, generate, based on a pressure applied to the sub-region of the first substrate corresponding to the sub-mechanism, a pressure-induced current corresponding to the pressure, and transmit the pressure-induced current to the control circuit. The control circuit is configured to apply an electric field corresponding to the pressure-induced current to the flatness adjustment layer of the sub-mechanism to enable the flatness adjustment layer to be deformed to match a sub-region of an upper substrate. The piezoelectric sensing layer of each sub-mechanism is configured to generate, based on a suction force applied to the sub-region of the first substrate corresponding to the sub-mechanism, a suction force-induced current corresponding to the suction force, and transmit the suction force-induced current to the control circuit. The control circuit is further configured to, based on the suction force-induced current, control a descending speed of the first platform and a voltage applied to the surface suction layer of the sub-mechanism to enable the surface suction layer of the sub-mechanism to be deformed based on the voltage.

In a possible embodiment of the present disclosure, the surface suction layer is deformed in an energized state to form a plurality of suction cups for attaching the upper substrate.

In a possible embodiment of the present disclosure, for each sub-mechanism, the piezoelectric sensing layer includes a first base substrate, a first sub-electrode arranged on the first base substrate, an intermediate layer arranged on the first sub-electrode, a second sub-electrode arranged on the intermediate layer, and a second base substrate arranged on the second sub-electrode. The first sub-electrode and the second sub-electrode form a capacitor. The flatness adjustment layer is configured to: when the first substrate is aligned with the second substrate to form the cell, generate an electric charge after a pressure is applied to the flatness adjustment layer to change a charge of the capacitor and to generate a pressure-induced current corresponding to the pressure. In the event that a pressure applied to the surface suction layer changes, the suction force applied to the first substrate and a resistivity of the surface suction layer change and the suction force-induced current corresponding to the suction force is generated in the capacitor.

In another aspect, the present disclosure provides an alignment method using the above-mentioned cell forming device. The alignment method includes: detecting preset marks on a first substrate and a second substrate; acquiring a first position offset of the first substrate relative to the second substrate based on a position difference between the preset mark on the first substrate and the corresponding preset mark on the second substrate; and performing a first adjustment to a position of the first substrate and/or the second substrate based on the first position offset.

In a possible embodiment of the present disclosure, the alignment method further includes: detecting the preset marks on the first substrate and the second substrate; acquiring a second position offset of the first substrate relative to the second substrate based on a position difference between the preset mark on the first substrate and the corresponding preset mark on the second substrate; and performing a second adjustment to a position of the first substrate and/or the second substrate based on the second position offset.

In a possible embodiment of the present disclosure, the acquiring a first position offset of the first substrate relative to the second substrate based on a position difference between the preset mark on the first substrate and the corresponding preset mark on the second substrate includes: scanning the first substrate or the second substrate, and calculating a position offset of the first substrate and a position offset of the second substrate based on a position difference between a stored reference mark and the corresponding preset mark on the first substrate or the second substrate to acquire the first position offset of the first substrate relative to the second substrate.

In a possible embodiment of the present disclosure, the alignment method further includes performing a binarization treatment to a regional image of the first substrate or the second substrate to identify a mark, and taking a gravity center of the mark as a position of the mark.

In a possible embodiment of the present disclosure, the alignment method further includes taking averages of coordinates of all pixels forming the mark as the gravity center of the mark.

In a possible embodiment of the present disclosure, the alignment method further includes providing two or more preset marks on the first substrate or the second substrate, and the first position offset of the first substrate relative to the second substrate includes a rotation angle offset and a coordinate offset.

The present disclosure has the following beneficial effects: the pre-alignment mechanism, the turn-over mechanism, the alignment mechanism and the cell forming mechanism are arranged integrally so as to shorten the flow for delivering the substrates; through the first suction surface and the second suction surface, it is unnecessary to turn the first platform over after the substrate on the first platform is aligned with the substrate on the second platform to form the cell, and instead, the first platform may be directly used to carry the next substrate, so it is possible to reduce the power consumption and save the time for alignment; and through the pre-alignment mechanism and the alignment mechanism, it is possible to align the first substrate with the second substrate efficiently.

DETAILED DESCRIPTION

The features and principles of the present disclosure will be described hereinafter in conjunction with the drawings and embodiments. The following embodiments are for illustrative purposes only, but shall not be used to limit the scope of the present disclosure.

Figure 1:
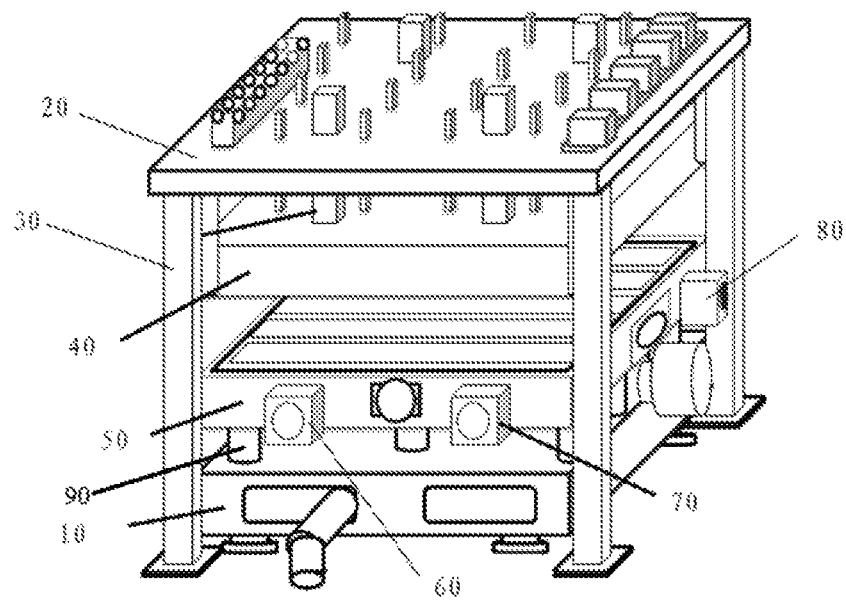
FIG. 1 is a schematic view showing a cell forming device according to the embodiments of the present disclosure.

As shown in FIG. 1, the present disclosure provides a cell forming device. The cell forming device includes a first platform 40 configured to carry a first substrate, a second platform 50 configured to carry a second substrate, and a pre-alignment mechanism. The first platform 40 includes a first suction surface and a second suction surface arranged opposite to each other and configured to attach the first substrate. The pre-alignment mechanism is configured to adjust the position of the first platform 40, so as to pre-align the first substrate with the second substrate.

The cell forming device further includes a turn-over mechanism, an alignment mechanism and a cell forming mechanism. The turn-over mechanism is configured to turn the first platform 40 over so as to turn the first substrate over. The alignment mechanism is configured to adjust the position of the second platform 50 so as to align the turned first substrate with the second substrate. The cell forming mechanism is configured to control the first substrate to move so as to form a cell with the second substrate.

Through the pre-alignment mechanism, the turn-over mechanism, the alignment mechanism and the cell forming mechanism, it is possible to increase the production efficiency, align the first substrate with the second substrate efficiently and reduce the time for delivering the substrate. Through the first suction surface and the second suction surface, it is unnecessary to turn the first platform 40 over after the first substrate on the first platform 40 is aligned with the second substrate on the second platform 50 to form the cell, and instead, the first platform 40 may be directly used to carry the next to-be-aligned substrate, so it is possible to reduce the power consumption and reduce the time for cell alignment. Through the pre-alignment mechanism and the alignment mechanism, it is possible to further align the first substrate with the second substrate efficiently.

FIG. 1 shows a schematic view showing the cell forming device according to the embodiments of the present disclosure. The cell forming device includes a pedestal 10, a top plate 20 and four support columns 30 arranged between the pedestal 10 and the top plate 20. In addition, a first platform 40 and a second platform 50 are arranged opposite to and parallel to each other between the pedestal 10 and the top plate 20.

In a possible embodiment of the present disclosure, the pre-alignment mechanism includes: a first driving mechanism 60 connected to the second platform 50 and configured to control the second platform 50 to rotate; a second driving mechanism 70 connected to the second platform 50 and configured to control the second platform 50 to move in a first direction in a horizontal plane; a third driving mechanism 80 connected to the second platform 50 and configured to control the second platform 50 to move in a second direction in the horizontal plane and perpendicular to the first direction; and a fourth driving mechanism 90 connected to the second platform 50 and configured to control the second platform 50 to move in a vertical direction.

Through the first driving mechanism 60, it is possible to rotate the second platform 50; through the second driving mechanism 70, it is possible to move the second platform 50 in the first direction in the horizontal plane; through the third driving mechanism 80, it is possible to move the second platform 50 in the second direction in the horizontal plane; and through the fourth driving mechanism, it is possible to move the second platform 50 in the vertical direction. In other words, the second platform 50 may move in various directions, so it is possible to align the first substrate with the second substrate in a more accurate manner.

By means of this arrangement, a substrate attached onto one of the first suction surface and the second suction surface is pre-aligned with an opposite substrate which forms a cell therewith before being turned over. The position difference between the substrate and the opposite substrate which forms the cell with the substrate after being turned over is mainly caused by a turn-over procedure of the substrates. Therefore, the position difference between the substrate and the opposite substrate which forms the cell with the substrate is small, and a movement distance of the substrates is reduced, the time for alignment after the substrates have been turned over is saved, and the alignment accuracy is increased. In addition, substrate and the opposite substrate are located at the same position, and when subsequent substrates and opposite substrates are to be aligned, it is unnecessary to perform any pre-alignment process for the subsequent substrates and the corresponding opposite substrates, thereby remarkably increasing the substrate alignment efficiency and improving the yield of the product.

In a possible embodiment of the present disclosure, the alignment mechanism is of a structure identical to the pre-alignment mechanism, so as to reduce the production costs and reduce the size of the cell forming device.

In a possible embodiment of the present disclosure, the first driving mechanism 60 includes a first movable table connected to the second platform 50; a first rotatable central shaft connected to the first movable table 40 via a bearing; a first driving motor; and a first transmission mechanism configured to be driven by the first driving motor to drive the first rotatable central shaft to rotate.

In a possible embodiment of the present disclosure, the second driving mechanism 70 includes: a second movable table connected to the second platform 50; a first guide rail arranged in the first direction, on which the second movable table is movably arranged; a second driving motor; and a second transmission mechanism configured to be driven by the second driving motor to drive the second movable table to move along the first guide rail.

In a possible embodiment of the present disclosure, the third driving mechanism 80 includes: a third movable table connected to the second platform 50; a second guide rail arranged in the second direction, on which the third movable table is movably arranged; a third driving motor; and a third transmission mechanism configured to be driven by the third driving motor to drive the third movable table to move along the second guide rail. The third movable table and the second movable table are the same movable table, and the second guide rail intersects the first guide rail.

In a possible embodiment of the present disclosure, the fourth driving mechanism includes: a fourth movable table connected to the second platform 50; a third guide rail arranged in the vertical direction, on which the fourth movable table is movably arranged; a fourth driving motor; and a fourth transmission mechanism configured to be driven by the fourth driving motor to drive the fourth movable table to move along the third guide rail.

To be specific, the first movable table, the second movable table, the third movable table and the fourth movable table are arranged sequentially from top to bottom (as shown in the drawings).

The first rotatable central shaft is arranged at the center of the first movable table. The first rotatable central shaft has a transition fit to a rotatable bearing, the rotatable bearing has a transition fit to the second movable table, and the first movable table moves in the first direction relative to the second movable table. In addition, in order to ensure the stability of the first movable table, steel-ball rollers are arranged at four corners of the first movable table, and the steel-ball rollers roll on a stainless steel sliding table on the second movable table. The first movable table is driven by a stepping motor, and the driving force is transmitted via a coupler and a ball screw. A ball screw nut is provided with a bearing seat, and a stainless steel shaft mounted at the bearing seat is connected to one end of a connection rod. A stainless steel shaft bearing connected to the other end of the connection rod is secured onto the first movable table. A movement hinge point and a rotation hinge point are formed at two fixation ends of the connection rod respectively. The second movable table and the third movable table share one platform, one stepping motor, one coupler, one ball screw and linear sliding rails arranged in a second direction and a third direction of the movable table. The linear sliding rails provide the guide direction for the movable table.

The fourth movable table includes a liftable bottom plate, a liftable lower platform, and a power mechanism and a follower mechanism arranged between the liftable bottom plate and the liftable lower platform. The power mechanism operates by manually adjusting a ball screw and is guided by a linear sliding rail, and the linear guiding rail is arranged on the liftable lower platform. A sliding block is connected to a movement mechanism which is also connected to the ball screw nut. The movement mechanism further includes two groups of rotatable shafts. A rotatable steel wheel is arranged at each end of each rotatable shaft and in contact with an oblique edge of liftable, oblique plate of the follower mechanism. The liftable, oblique plate is arranged on the liftable bottom plate. In addition, four guide columns are also arranged on the liftable bottom plate, and four sleeves cooperating with the four guide columns are arranged on the liftable lower platform. The guide columns and the sleeves function as to guide the movement of the liftable lower platform.

In a possible embodiment of the present disclosure, the turn-over mechanism includes a turn-over shaft, a driven gear for driving the turn-over shaft to rotate, a driving gear, and a gear motor for driving the driving gear to rotate.

In a possible embodiment of the present disclosure, the cell forming device further includes a buffering and stopping mechanism connected to the turn-over mechanism, so as to effectively protect the first platform 40 during the turn-over procedure.

In a possible embodiment of the present disclosure, the cell forming device further includes a dynamic perception adjustment mechanism and a control circuit. The dynamic perception adjustment mechanism is secured onto the first platform 40 and includes a plurality of sub-mechanisms each corresponding to a sub-region of the first substrate. Each sub-mechanism includes, from top to bottom, a flatness adjustment layer, a piezoelectric sensing layer and a surface suction layer.

In the case that the first substrate is aligned with the second substrate to form the cell, the piezoelectric sensing layer of each sub-mechanism is configured to generate, based on a pressure applied to the sub-region of the first substrate corresponding to the sub-mechanism, a pressure-induced current corresponding to the pressure, and transmit the pressure-induced current to the control circuit. The control circuit is configured to apply an electric field corresponding to the pressure-induced current to the flatness adjustment layer of the sub-mechanism, so as to enable the flatness adjustment layer to be deformed in such a manner as to be adapted to a sub-region of an upper substrate.

The piezoelectric sensing layer of each sub-mechanism is configured to generate, based on a suction force applied to the sub-region of the first substrate corresponding to the sub-mechanism, a suction force-induced current corresponding to the suction force, and transmit the suction force-induced current to the control circuit. The control circuit is further configured to, based on the suction force-induced current, control a descending speed of the first platform 40 and a voltage applied to the surface suction layer of the sub-mechanism, so as to enable the surface suction layer of the sub-mechanism to be deformed in accordance with the voltage.

In a possible embodiment of the present disclosure, the surface suction layer is deformed in an energized state, so as to form a plurality of suction cups for attaching the upper substrate.

In a possible embodiment of the present disclosure, for each sub-mechanism, the piezoelectric sensing layer includes a first base substrate, a first sub-electrode arranged on the first base substrate, an intermediate layer arranged on the first sub-electrode, a second sub-electrode arranged on the intermediate layer, and a second base substrate arranged on the second sub-electrode.

The first sub-electrode and the second sub-electrode form a capacitor. In the case that the first substrate is aligned with the second substrate to form the cell, the flatness adjustment layer is configured to generate charges after a pressure is applied thereto, so as to change the charges of the capacitor and thereby to generate the pressure-induced current corresponding to the pressure. In the case that a pressure applied to the surface suction layer changes, the suction force applied to the first substrate and thereby the resistivity of the surface suction layer change, so that the suction force-induced current corresponding to the suction force is generated in the capacitor.

In the vacuum cell forming device, in the case that the first substrate is aligned with the second substrate to for the cell, the piezoelectric sensing layer of each sub-mechanism may generate, based on the pressure applied to the sub-region of the first substrate corresponding to the sub-mechanism, the pressure-induced current corresponding to the pressure, and then transmit the pressure-induced current to the control circuit. The control circuit may apply the electric field corresponding to the pressure-induced current to the flatness adjustment layer of the sub-mechanism, so as to enable the flatness adjustment layer of the sub-mechanism to be deformed in such a manner as to be adapted to the sub-region of the corresponding upper substrate, thereby compensating for the flatness of the first substrate and preventing the uneven force applied to the first substrate due to an uneven surface of the first substrate. In addition, the piezoelectric sensing layer of each sub-mechanism may generate, based on the suction force applied to the sub-region of the first substrate corresponding to the sub-mechanism, the suction force-induced current corresponding to the suction force, and transmit the suction force-induced current to the control circuit. The control circuit may control the descending speed of an upper machine table and the voltage applied to the surface suction layer of the sub-mechanism based on the suction force-induced current, so as to enable the surface suction layer of each sub-mechanism to be deformed based on the voltage, thereby applying an uneven force to the upper substrate and further improving the alignment accuracy and alignment quality.

As shown in FIG. 1, the cell forming device further includes an electrical component box, a vacuum pump, a pneumatic control element and an upper bracket. The upper bracket is arranged on an alignment chamber. A trichromatic lamp is arranged on the upper bracket, and a safety protection device is arranged on a side column of the upper bracket. In addition, the upper bracket is further provided with a human-machine interface, and an air purifier is arranged at the top of the upper bracket.

Figure 2:
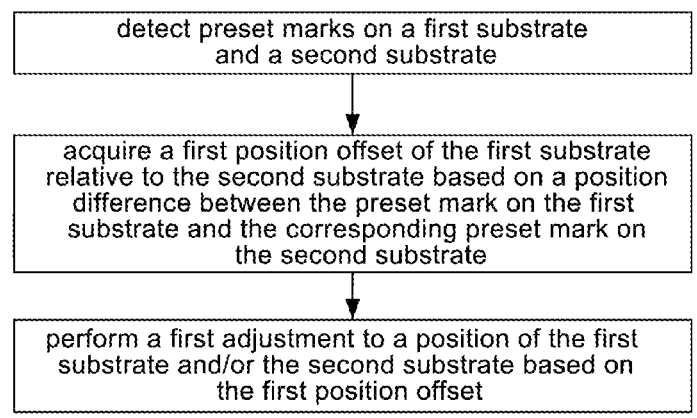
FIG. 2 is a flow chart of an alignment method according to the embodiments of the present disclosure.

As shown in FIG. 2, the present disclosure further provides an alignment method using the above-mentioned cell forming device. The alignment method includes steps of: detecting preset marks on the first substrate and the second substrate; acquiring a first position offset of the first substrate relative to the second substrate based on a position difference between the preset mark on the first substrate and the corresponding preset mark on the second substrate; and performing a first adjustment to a position of the first substrate and/or the second substrate based on the first position offset.

Through the above-mentioned steps, it is possible to detect the position offset of the first substrate relative to the second substrate and thereby to improve the alignment accuracy.

In a possible embodiment of the present disclosure, the alignment method further includes steps of: detecting the preset marks on the first substrate and the second substrate; acquiring a second position offset of the first substrate relative to the second substrate based on a position difference between the preset mark on the first substrate and the corresponding preset mark on the second substrate; and performing a second adjustment to a position of the first substrate and/or the second substrate based on the second position offset.

In the embodiments of the present disclosure, through the first adjustment (i.e., coarse adjustment) and the second adjustment (fine adjustment), it is possible to further improve the alignment accuracy.

Further, the step of acquiring the first position offset of the first substrate relative to the second substrate based on the position difference between the preset mark on the first substrate and the corresponding preset mark on the second substrate includes scanning the first substrate or the second substrate, and calculating a position offset of the first substrate and a position offset of the second substrate based on a position difference between a stored reference mark and the corresponding preset mark on the first substrate or the second substrate, so as to acquire the first position offset of the first substrate relative to the second substrate.

During the alignment process, a charge coupled device (CCD) camera may be arranged above each of the first platform 40 and the second platform 50. Based on the coverage of the selected CCD camera, a CCD camera capable of acquiring an image the entire to-be-detected substrate (the first substrate or second substrate) in a single shot, or a scanning CCD camera, may be adopted. Usually, four CCD cameras may be arranged at positions corresponding to four corners of the to-be-detected substrate. The CCD camera may take an image of the substrate, and it is connected to an image acquisition unit and an image processing unit. The image processing unit which is used to recognize the images photographed by the CCD cameras, e.g., a computer, may identify a mark on the image taken by the CCD camera based on a pre-stored mark image, so as to determine a position of the mark on the image. A programmable logic controller (PLC) may compare the position of the mark with a reference position, so as to determine a movement amount by which the first or second substrate needs to move, and transmit the movement amount to a movement controller. The movement controller may control the operation of the alignment mechanism based on the movement amount, so as to move the first or second substrate to a proper position. An alignment light-emitting diode (LED) light source may be arranged below each of the first platform 40 and the second platform 50, so as to help the CCD camera to take the image.

In a possible embodiment of the present disclosure, the alignment method further includes performing a binarization treatment to a regional image of the first substrate or the second substrate to identify a mark, and taking a gravity center of the mark as a position of the mark.

In a possible embodiment of the present disclosure, the alignment method further includes taking averages of coordinates of all pixels forming the mark as the gravity center of the mark.

In a possible embodiment of the present disclosure, the alignment method further includes providing two or more preset marks on the first substrate or the second substrate, and the first position offset of the first substrate relative to the second substrate includes a rotation angle offset and a coordinate offset.

The way to detect the first position offset will be described hereinafter.

The mark may be identified by performing a binarization treatment to the regional image of the first substrate or the second substrate. At first, the regional image of the substrate taken by a camera may be subjected to the binarization treatment, so as to acquire a binarized image. The so-called binarized image refers to an image including pixels the grayscale values of which are 0 or 255. During the treatment, a grayscale threshold may be provided, and in the event that the grayscale values of the pixels in the image of the mark are above or equal to the grayscale threshold, these pixels may be determined as mark pixels, and the grayscale values of these pixels are represented by 255. In the event that the grayscale values of the pixels in the mark image are below the grayscale threshold, these pixels may not be determined as the mark pixels, and the grayscale values are represented by 0. In this way, it is possible to acquire all the pixels for forming a profile, which may be compared with a shape and a size of a pre-stored reference mark, so as to determine whether this profile is just the mark.

The pre-stored reference mark may be acquired as follows. An image of the substrate with the mark may be taken at first, and then the shape and size of the reference mark may be acquired based on the grayscale threshold, so as to serve as a reference for the comparison. For example, in the event that the size is used as the reference for the comparison, shooting parameters shall be identical to those used during the alignment process in the alignment chamber.

The gravity center of the mark may be determined based on the position of the mark. Usually, averages of the coordinates of all the pixels in a mark may be taken as the gravity center of the mark.

Usually, the first substrate or the second substrate may be scanned, and a position offset of the first substrate and a position offset of the second substrate may be calculated based on a position difference between the pre-stored reference mark and the corresponding actual mark, so as to acquire the first position offset of the first substrate relative to the second substrate.

In a possible embodiment, the first substrate or the second substrate includes two or more marks, and the first position offset of the first substrate relative to the second substrate includes a rotation angle offset and a coordinate offset.

An exemplary method for calculating the first position offset will be described hereinafter.

At an initial position, in the event that the mark on the upper substrate has not been identified yet, the camera may search for the mark automatically.

Figure 3:
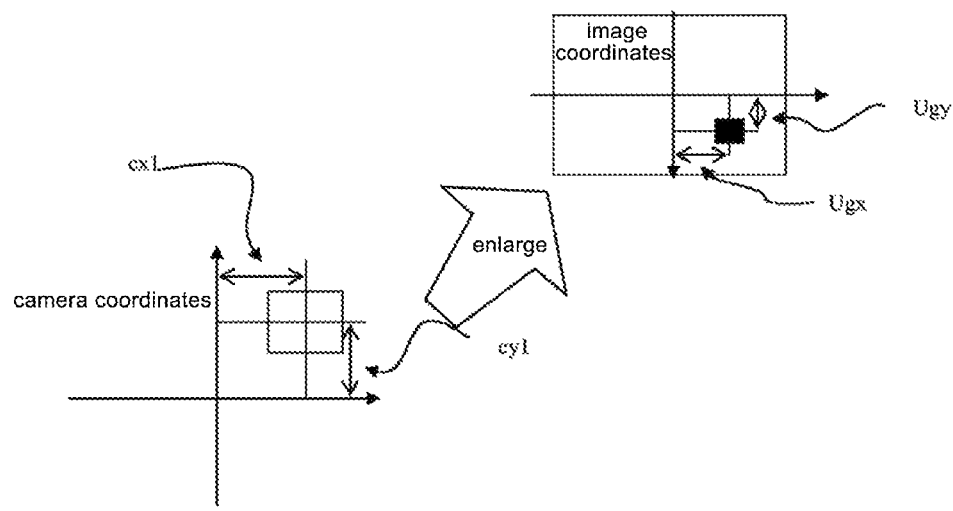
FIG. 3 is a schematic view showing the detection of a preset mark on a first substrate according to the embodiments of the present disclosure.

At this time, as shown in FIG. 3, a difference between identified coordinates of the preset mark on the first substrate and coordinates of the initial position may be expressed as:

$$(cx1, cy1) \qquad (1).$$

A difference between coordinates of the preset mark on the first substrate identified by the image processing and a center of a visual field may be expressed as:

$$(Ugx1, Ugy1) \qquad (2).$$

An initial position of the camera may be expressed as:

$$(csx1, csy1) \qquad (3).$$

At this time, coordinates of the identifier preset mark on the first substrate may be expressed as:

$$(csx1+cx1+Ugx1,\ csy1+cy1-Ugy1) \qquad (4).$$

The above coordinates are coordinates related to first Camera1. Similarly, the coordinates of the preset marks on the first substrate related to Camera2 to Camera4 may be expressed as:

$$(csx2+cx2+Ugx2,\ csy2+cy2-Ugy2) \qquad (5),$$

$$(csx3+cx3+Ugx3,\ csy3+cy3-Ugy3) \qquad (6),\text{ and}$$

$$(csx4+cx4+Ugx4,\ csy4+cy4-Ugy4) \qquad (7).$$

In the event that the mark on the second substrate has not been identified at the initial position, the table where the second substrate is placed may be moved so as to search for the mark.

Figure 4:
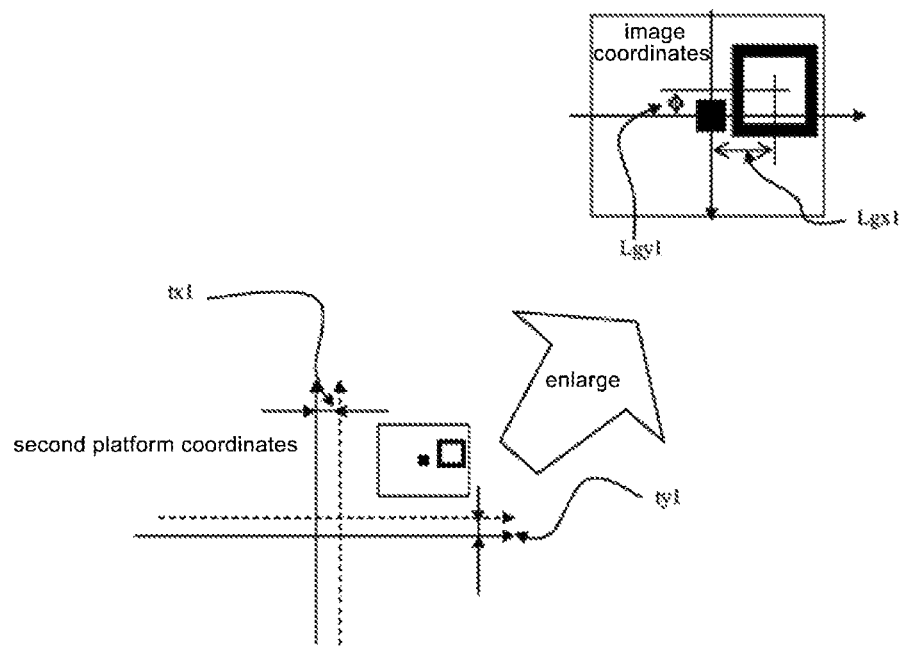
FIG. 4 is a schematic view showing the detection of a preset mark on a second substrate according to the embodiments of the present disclosure.

At this time, as shown in FIG. 4, a difference between identified coordinates of the preset mark on the second substrate and coordinates of the initial position may be expressed as:

$$(tx1, ty1) \qquad (8).$$

An actual difference between coordinates of the preset mark on the second substrate identified by the image processing and a center of a visual field may be expressed as:

$$(Lgx1, Lgy1) \qquad (9).$$

The coordinates of the camera corresponding to the identified coordinates of the preset mark on the first substrate are expressed as (csx1+cx1, csy1+cy1), so the coordinates of the preset mark on the second substrate may be expressed as:

$$(csx1+cx1-tx1+Lgx1,\ csy1+cy1-ty1-Lgy1) \qquad (10).$$

The above coordinates are coordinates related to the Camera 1. Similarly, the coordinates of the preset mark on the lower substrate related to Camera 2 to Camera 4 may be expressed as:

$$(csx2+cx2-tx2+Lgx2,\ csy2+cy2-ty2-Lgy2) \qquad (11),$$

$$(csx3+cx3-tx3+Lgx3,\ csy3+cy3-ty3-Lgy3) \qquad (12),\text{ and}$$

$$(csx4+cx4-tx4+Lgx4,\ csy4+cy4-ty4-Lgy4) \qquad (13).$$

The coordinates of the preset marks on the first substrate in (4)~(7) may be expressed as:

$$(Umx1, Umy1) \qquad (14),$$

$$(Umx2, Umy2) \qquad (15),$$

$$(Umx3, Umy3) \qquad (16),\text{ and}$$

$$(Umx4, Umy4) \qquad (17).$$

The coordinates of the preset marks on the second substrate in (10)~(13) may be expressed as:

$$(Lmx1, Lmy1) \qquad (18),$$

$$(Lmx2, Lmy2) \qquad (19),$$

$$(Lmx3, Lmy3) \qquad (20),\text{ and}$$

$$(Lmx4, Lmy4) \qquad (21).$$

Figure 5:
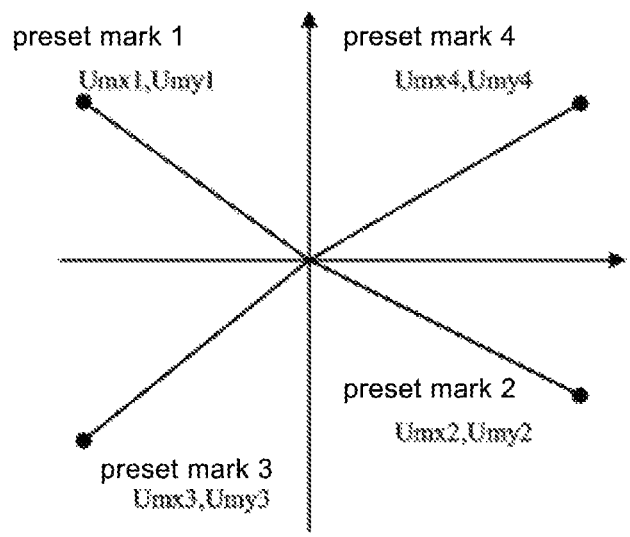
FIG. 5 is a schematic view showing a position relationship between the first platform and the preset marks on the first substrate according to the embodiments of the present disclosure.
Figure 6:
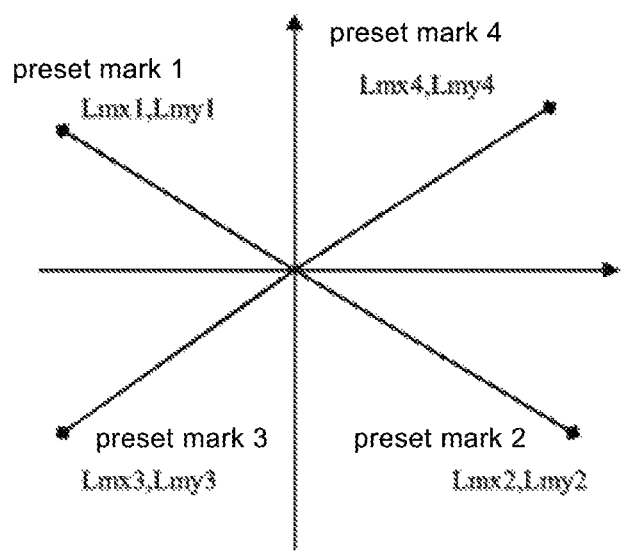
FIG. 6 is a schematic view showing a position relationship between the second platform and the preset marks on the second substrate according to the embodiments of the present disclosure.

FIGS. 5 and 6 show the position relationship between centers of the first platform and the second platform and the preset marks. FIG. 5 shows the preset marks on the first substrate, and FIG. 6 shows the preset marks on the second substrate.

A gravity center of a triangle 1, 2, 3 may be expressed as:

$$\left(\frac{Umx1 + Umx2 + Umx3}{3}, \frac{Umy1 + Umy2 + Umy3}{3}\right), \qquad (22)$$

and a gravity center of a triangle 1, 2, 4 may be expressed as:

$$\left(\frac{Umx1 + Umx2 + Umx4}{3}, \frac{Umy1 + Umy2 + Umy4}{3}\right). \qquad (23)$$

Hence, based on (22) and (23), a slope of a line A1 connecting the gravity centers of the two triangles may be calculated by:

$$Ulineang1 = \frac{Umy4 - Umy3}{Umx4 - Umx3}. \qquad (24)$$

Similarly, a Y slice of a line 11 may be calculated by:

$$Useppen1 = \qquad (25)$$
$$\frac{Umy1 + Umy2 + Umy3}{3} - Ulineang1 \times \frac{Umx1 + Umx2 + Umx3}{3}.$$

A slope of a line 12 connecting a gravity center of a triangle obtained by connecting the marks 1, 3 and 4 and a gravity center of a triangle obtained by connecting the marks 2, 3 and 4 may be calculated by:

$$Ulineang2 = \frac{Umy2 - Umy1}{Umx2 - Umx1}, \qquad (26)$$

and a Y slice of the line 12 may be calculated by:

$$Useppen2 = \qquad (27)$$
$$\frac{Umy2 + Umy3 + Umy4}{3} - Ulineang2 \times \frac{Umx2 + Umx3 + Umx4}{3}.$$

A gravity center of the first substrate is an intersection of the line 11 and the line 12, and the coordinates of the gravity center may be:

$$Ugx = \frac{Useppen2 - Useppen1}{Ulineang1 - Ulineang2}, \text{ and} \quad (28)$$

$$Ugy = Ugx \times Ulineagn1 + Useppen1. \quad (29)$$

Slopes of lines connecting the gravity center of the first substrate and the preset marks may be calculated by:

$$Uang1 = -1 \times \tan^{-1}\left(\frac{Umy1 - Ugy}{Umx1 - Ugx}\right), \quad (30)$$

$$Uang2 = -1 \times \tan^{-1}\left(\frac{Umy2 - Ugy}{Umx2 - Ugx}\right), \quad (31)$$

$$Uang3 = -1 \times \tan^{-1}\left(\frac{Umy3 - Ugy}{Umx3 - Ugx}\right), \text{ and} \quad (32)$$

$$Uang4 = -1 \times \tan^{-1}\left(\frac{Umy4 - Ugy}{Umx4 - Ugx}\right). \quad (33)$$

Similar to the above equations (24) to (33), the following calculations may be performed for the second substrate:

$$Llineang1 = \frac{Lmy4 - Lmy3}{Lmx4 - Lmx3}, \quad (34)$$

$$Lseppen1 = \frac{Lmy1 + Lmy2 + Lmy3}{3} - Llinang1 \times \frac{Lmx1 + Lmx2 + Lmx3}{3}, \quad (35)$$

$$Llineang2 = \frac{Lmy2 - Lmy1}{Lmx2 - Lmx1}, \quad (36)$$

$$Lseppen2 = \frac{Lmy2 + Lmy3 + Lmy4}{3} - Llineang2 \times \frac{Lmx2 + Lmx3 + Lmx4}{3}, \quad (37)$$

$$Lgx = \frac{Lseppen2 - Lseppen1}{Llineang1 - Llineang2}, \quad (38)$$

$$Lgy = Lgx \times Llineagn1 + Lseppen1, \quad (39)$$

$$Lang1 = -1 \times \tan^{-1}\left(\frac{Lmy1 - Lgy}{Lmx1 - Lgx}\right), \quad (40)$$

$$Lang2 = -1 \times \tan^{-1}\left(\frac{Lmy2 - Lgy}{Lmx2 - Lgx}\right), \quad (41)$$

$$Lang3 = -1 \times \tan^{-1}\left(\frac{Lmy3 - Lgy}{Lmx3 - Lgx}\right), \text{ and} \quad (42)$$

$$Lang4 = -1 \times \tan^{-1}\left(\frac{Lmy4 - Lgy}{Lmx4 - Lgx}\right). \quad (43)$$

Figure 7:
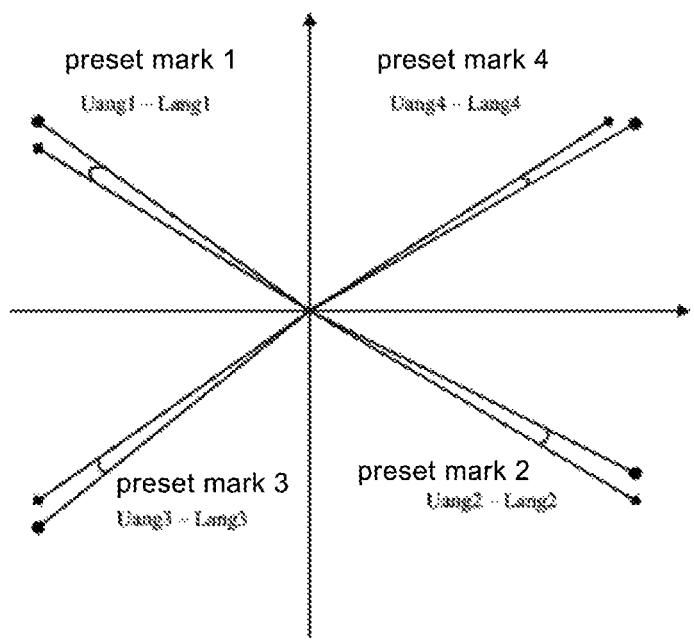
FIG. 7 is a schematic view showing corresponding marks on the first substrate and the second substrate according to the embodiments of the present disclosure.

FIG. 7 shows the preset marks on the first substrate and the second substrate. It is possible to calculate a rotation angle offset using the following equation:

$$Rdat = \left(\frac{(Uang1 - Lang1) + (Uang2 - Lang2) + (Uang3 - Lang3) + (Uang4 - Lang4)}{4}\right). \quad (44)$$

Then, the coordinates of the preset mark 1 on the second substrate may be calculated after the rotation correction.

At first, coordinate system conversion may be performed on the coordinates of the preset mark on the second substrate. In the event that the preset mark on the second substrate has been identified, coordinates of a position of the second platform may be calculated as (tx1, ty1) in accordance with the equation (8). Hence, the followings are obtained:

$$Lmx1 = Lmx1 - tx1 \quad (45), \text{ and}$$

$$Lmy1 = Lmy1 - ty1 \quad (46).$$

Rows and columns of the revolved coordinate system may be expressed as:

$$\begin{bmatrix} \cos\Theta & \sin\Theta \\ -\sin\Theta & \cos\Theta \end{bmatrix} \begin{bmatrix} x \\ y \end{bmatrix} = \begin{bmatrix} TmpX \\ TmpY \end{bmatrix}, \quad (47)$$

where $\Theta$ represents a revolution angle, x and y represent coordinates before the revolution, and TmpX and TmpY represent coordinates after the revolution. Hence, the followings are obtained:

$$TmpX1 = \cos(Rdat) \times Lmx1 + \sin(Rdat) \times Lmy1 \quad (48), \text{ and}$$

$$TmpY1 = -\sin(Rdat) \times Lmx1 + \cos(Rdat) \times Lmy1 \quad (49).$$

The followings are obtained from (45), (46):

$$TmpX1 = TmpX1 + tx1 \quad (50), \text{ and}$$

$$TmpY1 = TmpY1 + ty \quad (51).$$

Hence, an offset of the preset mark 1 on the first substrate after the first rotatable central shaft is revolved may be calculated by:

$$SAX1 = Umx1 - Tmpx1 \quad (52), \text{ and}$$

$$SAY1 = Umy1 - Tmpy1 \quad (53).$$

Similarly, the coordinates in (45)~(53) related to the preset marks 2, 3 and 4 may be calculated.

To be specific, the relevant parameters of the preset mark 2 may be calculated by:

$$Lmx2 = Lmx2 - tx1 \quad (54),$$

$$Lmy2 = Lmy2 - ty1 \quad (55),$$

$$TmpX2 = \cos(Rdat) \times Lmx2 + \sin(Rdat) \times Lmy2 \quad (56),$$

$$TmpY2 = -\sin(Rdat) \times Lmx2 + \cos(Rdat) \times Lmy2 \quad (57),$$

$$TmpX2 = TmpX2 + tx1 \quad (58),$$

$$TmpY2 = TmpY2 + ty1 \quad (59),$$

$$SAX2 = Umx2 - Tmpx2 \quad (60), \text{ and}$$

$$SAY2 = Umy2 - Tmpy2 \quad (61).$$

The relevant parameters of the preset mark 3 may be calculated by:

$$Lmx3 = Lmx3 - tx1 \quad (62),$$

$$Lmy3 = Lmy3 - ty1 \quad (63),$$

$$TmpX3 = \cos(Rdat) \times Lmx3 + \sin(Rdat) \times Lmy3 \quad (64),$$

$$TmpY3 = -\sin(Rdat) \times Lmx3 + \cos(Rdat) \times Lmy3 \quad (65),$$

$$TmpX3 = TmpX3 + tx1 \quad (66),$$

$$TmpY3 = TmpY3 + ty1 \quad (67),$$

$$SAX3=Umx3-Tmpx3 \qquad (68), \text{ and}$$

$$SAY3=Umy3-Tmpy3 \qquad (69).$$

The relevant parameters of the preset mark 4 may be calculated by:

$$Lmx4=Lmx4-tx1 \qquad (70),$$

$$Lmy4=Lmy4-ty1 \qquad (71),$$

$$TmpX4=\cos(Rdat) \times Lmx4 + \sin(Rdat) \times Lmy4 \qquad (72),$$

$$TmpY4=-\sin(Rdat) \times Lmx4 + \cos(Rdat) \times Lmy4 \qquad (73),$$

$$TmpX4=TmpX4+tx1 \qquad (74),$$

$$TmpY4=TmpY4+ty1 \qquad (75),$$

$$SAX4=Umx4-Tmpx4 \qquad (76), \text{ and}$$

$$SAY4=Umy4-Tmpy4 \qquad (77).$$

The offsets of the preset marks may be averaged, so as to calculate correction amounts of the X-axis and Y-axis coordinates by:

$$SAX = \frac{SAX1 + SAX2 + SAX3 + SAX4}{4}, \text{ and} \qquad (78)$$

$$SAY = \frac{SAY1 + SAY2 + SAY3 + SAY4}{4}. \qquad (79)$$

The calculation of the rotation angle offset and the coordinate offset have been described hereinbefore by taking four preset marks as an example. Those skilled in the art should understand that this method is also applicable to the situation where there are any other number of preset marks. It should be appreciated that, in the vacuum cell forming device, the preset marks on the first substrate and the second substrate are identified by the same camera, and thus imaging interference may be prevented by adjusting the focal length of the camera.

The second position offset may be calculated in an identical or similar manner as the first position offset. For example, the image may be subjected to the binarization treatment so as to identify the preset marks, and the gravity center of each preset mark may be used as the position of the mark, so as to acquire the position offset, which will not be repeated herein.

The above are merely optional embodiments of the present disclosure. Apparently, a person skilled in the art may make further modifications and improvements without departing from the spirit of the present disclosure, and these modifications and improvements shall also fall within the scope of the present disclosure.

What is claimed is:

1. A cell forming device, comprising: a first platform configured to carry a first substrate, a second platform configured to carry a second substrate, a pre-alignment mechanism, a turn-over mechanism, an alignment mechanism and a cell forming mechanism, wherein
the first platform comprises a first suction surface and a second suction surface at opposite sides of the first platform, wherein the first suction surface is configured to suction the first substrate to be oppositely arranged to the second substrate when carried by the second platform to form a cell, and the second suction surface is configured to suction another first substrate to be oppositely arranged with another second substrate when carried by the second platform to form a cell,
the turn-over mechanism is configured to turn the first platform over to turn the first substrate over,
the alignment mechanism is configured to adjust a position of the second platform to align the turned first substrate with the second substrate, and
the cell forming mechanism is configured to move the first substrate to form a cell with the second substrate;
wherein the pre-alignment mechanism is configured to adjust, before the first platform is turned over, a position of the first platform to pre-align the first substrate with the second substrate.

2. The cell forming device according to claim 1, wherein the pre-alignment mechanism comprises:
a first driving mechanism connected to the first platform and configured to control the first platform to rotate;
a second driving mechanism connected to the first platform and configured to control the first platform to move in a first direction in a horizontal plane;
a third driving mechanism connected to the first platform and configured to control the first platform to move in a second direction in the horizontal plane, the second direction being perpendicular to the first direction; and
a fourth driving mechanism connected to the first platform and configured to control the first platform to move in a vertical direction.

3. The cell forming device according to claim 2, wherein the first driving mechanism comprises:
a first movable table connected to the first platform;
a first rotatable central shaft connected to the first movable table via a bearing;
a first driving motor; and
a first transmission mechanism configured to be driven by the first driving motor to rotate the first rotatable central shaft.

4. The cell forming device according to claim 2, wherein the second driving mechanism comprises:
a second movable table connected to the first platform;
a first guide rail arranged in the first direction, the second movable table being movably arranged on the first guide rail;
a second driving motor; and
a second transmission mechanism configured to be driven by the second driving motor to move the second movable table along the first guide rail.

5. The cell forming device according to claim 4, wherein the third driving mechanism comprises:
a third movable table connected to the first platform;
a second guide rail arranged in the second direction, the third movable table being movably arranged on the second guide rail;
a third driving motor; and
a third transmission mechanism configured to be driven by the third driving motor to move the third movable table along the second guide rail, and
the third movable table and the second movable table are a same movable table, and the second guide rail intersects the first guide rail.

6. The cell forming device according to claim 2, wherein the fourth driving mechanism comprises:
a fourth movable table connected to the first platform;
a third guide rail arranged in the vertical direction, the fourth movable table being movably arranged on the third guide rail;
a fourth driving motor; and a fourth transmission mechanism configured to be driven by the fourth driving motor to move the fourth movable table along the third guide rail.

7. The cell forming device according to claim 2, wherein the alignment mechanism has an identical structure to the pre-alignment mechanism.

8. The cell forming device according to claim 1, further comprising a buffering and stopping mechanism connected to the turn-over mechanism.

9. The cell forming device according to claim 1, further comprising a dynamic perception adjustment mechanism and a control circuit,
wherein the dynamic perception adjustment mechanism is secured onto the first platform and comprises a plurality of sub-mechanisms each corresponding to a sub-region of the first substrate,
each of the plurality of sub-mechanisms comprises, from top to bottom, a flatness adjustment layer, a piezoelectric sensing layer and a surface suction layer,
the piezoelectric sensing layer of each of the plurality of sub-mechanisms is configured to: when the first substrate is aligned with the second substrate to form the cell, generate, based on a pressure applied to the sub-region of the first substrate corresponding to the sub-mechanism, a pressure-induced current corresponding to the pressure, and transmit the pressure-induced current to the control circuit;
the control circuit is configured to apply an electric field corresponding to the pressure-induced current to the flatness adjustment layer of the sub-mechanism to enable the flatness adjustment layer to be deformed to match a corresponding sub-region of an upper substrate;
the piezoelectric sensing layer of each of the plurality of sub-mechanisms is configured to generate, based on a suction force applied to the sub-region of the first substrate corresponding to the sub-mechanism, a suction force-induced current corresponding to the suction force, and transmit the suction force-induced current to the control circuit, and
the control circuit is configured to control, based on the suction force-induced current, a descending speed of the first platform and a voltage applied to the surface suction layer of the sub-mechanism to enable the surface suction layer of the sub-mechanism to be deformed based on the voltage.

10. The cell forming device according to claim 9, wherein the surface suction layer is deformed in an energized state to form a plurality of suction cups for attaching the upper substrate.

11. The cell forming device according to claim 9, wherein for each of the plurality of sub-mechanisms, the piezoelectric sensing layer comprises a first base substrate, a first sub-electrode arranged on the first base substrate, an intermediate layer arranged on the first sub-electrode, a second sub-electrode arranged on the intermediate layer, and a second base substrate arranged on the second sub-electrode;
the first sub-electrode and the second sub-electrode form a capacitor;
the flatness adjustment layer is configured to: when the first substrate is aligned with the second substrate to form the cell, generate charges after a pressure is applied to the flatness adjustment layer to change a charge of the capacitor and thereby to generate a pressure-induced current corresponding to the pressure; and in the event that a pressure applied to the surface suction layer changes, the suction force applied to the first substrate and a resistivity of the surface suction layer change, and the suction force-induced current corresponding to the suction force is generated in the capacitor.

12. An alignment method using a cell forming device, wherein
the cell forming device comprises: a first platform configured to carry a first substrate, a second platform configured to carry a second substrate, a pre-alignment mechanism, a turn-over mechanism, an alignment mechanism and a cell forming mechanism,
the first platform comprises a first suction surface and a second suction surface at opposite sides of the first platform, wherein the first suction surface is configured to suction the first substrate to be oppositely arranged to the second substrate carried by the second platform to form a cell, and the second suction surface is configured to suction another first substrate to be oppositely arranged with another second substrate carried by the second platform to form a cell,
the turn-over mechanism is configured to turn the first platform over to turn the first substrate over,
the alignment mechanism is configured to adjust a position of the second platform to align the turned first substrate with the second substrate, and
the cell forming mechanism is configured to move the first substrate to form a cell with the second substrate,
wherein the pre-alignment mechanism is configured to adjust, before the first platform is turned over, a position of the first platform to pre-align the first substrate with the second substrate; and
the alignment method comprises:
detecting preset marks on the first substrate and the second substrate;
acquiring a first position offset of the first substrate relative to the second substrate based on a position difference between the preset mark on the first substrate and the corresponding preset mark on the second substrate; and
performing a first adjustment to a position of the first substrate and/or the second substrate based on the first position offset.

13. The alignment method according to claim 12, further comprising:
detecting the preset marks on the first substrate and the second substrate;
acquiring a second position offset of the first substrate relative to the second substrate based on a position difference between the preset mark on the first substrate and the corresponding preset mark on the second substrate; and
performing a second adjustment to a position of the first substrate and/or the second substrate based on the second position offset.

14. The alignment method according to claim 12, wherein the acquiring a first position offset of the first substrate relative to the second substrate based on a position difference between the preset mark on the first substrate and the corresponding preset mark on the second substrate comprises:
scanning the first substrate or the second substrate, and calculating a position offset of the first substrate and a position offset of the second substrate based on a position difference between a stored reference mark and the corresponding preset mark on the first substrate or the second substrate to acquire the first position offset of the first substrate relative to the second substrate.

15. The alignment method according to claim 12, further comprising:
performing a binarization treatment to a regional image of the first substrate or the second substrate to identify a mark; and
taking a gravity center of the mark as a position of the mark.

16. The alignment method according to claim 15, further comprising: taking averages of coordinates of all pixels forming the mark as the gravity center of the mark.

17. The alignment method according to claim 12, further comprising: providing two or more preset marks on the first substrate or the second substrate, wherein the first position offset of the first substrate relative to the second substrate comprises a rotation angle offset and a coordinate offset.

* * * * *